United States Patent
Venkataramana et al.

(10) Patent No.: US 11,790,789 B2
(45) Date of Patent: Oct. 17, 2023

(54) GLIDING VERTICAL MARGIN GUIDANCE METHODS AND SYSTEMS

(71) Applicant: HONEYWELL INTERNATIONAL INC., Morris Plains, NJ (US)

(72) Inventors: Kiran Venkataramana, Bangalore (IN); Kalimulla Khan, Bangalore (IN); Raghu Shamasundar, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 158 days.

(21) Appl. No.: 16/983,881

(22) Filed: Aug. 3, 2020

(65) Prior Publication Data
US 2021/0383703 A1    Dec. 9, 2021

(30) Foreign Application Priority Data
Jun. 5, 2020   (IN) .............................. 202011023637

(51) Int. Cl.
*G08G 5/00*        (2006.01)
*B64D 43/00*       (2006.01)
(Continued)

(52) U.S. Cl.
CPC .............. *G08G 5/003* (2013.01); *B64D 43/00* (2013.01); *G01S 19/42* (2013.01); *G01S 19/53* (2013.01);
(Continued)

(58) Field of Classification Search
CPC ...... G08G 5/003; G08G 5/0047; B64D 43/00; G01S 19/42; G01S 19/53; G05D 1/042; G05D 1/101
See application file for complete search history.

(56) References Cited

U.S. PATENT DOCUMENTS 4,539,843 A * 9/1985 Wise ..................... G01P 3/62
                                                      73/179
8,275,499 B2   9/2012 Coulmeau et al.
(Continued)

FOREIGN PATENT DOCUMENTS

FR           3104706 A1     6/2021

OTHER PUBLICATIONS

"Proposed Temporary Deviation on Total Engine Flame OUt and Propeller Unfeathering Conditions under Aircraft Emergency Electrical Configuration, Applicable to A400M," Sep. 11, 2007, https://www.easa.europa.eu/sites/default/files/dfu/Temp%20Deviation%20E-15%20A400M%20Proplr%20Unfthrng%20under%20Emer%20Elctrc/%20Conds.pdf.

*Primary Examiner* — Aniss Chad
*Assistant Examiner* — Stephanie T Su
(74) *Attorney, Agent, or Firm* — Lorenz & Kopf LLP

(57) ABSTRACT

Methods and systems are provided for guiding or otherwise assisting operation of an aircraft en route to an airport. One method involves identifying a reference point in advance of a runway, dynamically determining a gliding vertical trajectory for the aircraft en route to the reference point based at least in part on a current altitude of the aircraft at a current aircraft location and gliding characteristics of the aircraft, and providing a graphical indication of a difference between a predicted altitude of the aircraft at a location corresponding to the reference point resulting from the gliding vertical trajectory and an altitude criterion associated with the reference point. The graphical indication of the difference dynamically updates as the aircraft travels.

19 Claims, 5 Drawing Sheets

(51) Int. Cl.
  *G05D 1/04* (2006.01)
  *G01S 19/53* (2010.01)
  *G01S 19/42* (2010.01)
  *G05D 1/10* (2006.01)

(52) U.S. Cl.
  CPC ............ *G05D 1/042* (2013.01); *G05D 1/101* (2013.01); *G08G 5/0047* (2013.01)

(56) References Cited

U.S. PATENT DOCUMENTS

| | | | |
|---|---|---|---|
| 8,412,392 B2 | 4/2013 | Jayathirtha et al. | |
| 8,462,020 B1* | 6/2013 | Vanhoozer | B64D 45/00 340/975 |
| 8,798,815 B1* | 8/2014 | Burgin | B64D 45/00 701/9 |
| 9,086,280 B2 | 7/2015 | Gurusamy et al. | |
| 9,342,988 B2 | 5/2016 | Bourret et al. | |
| 9,368,036 B2 | 6/2016 | Coulmeau et al. | |
| 9,384,670 B1 | 7/2016 | Fisher et al. | |
| 9,454,908 B2 | 9/2016 | Moune et al. | |
| 9,561,868 B2 | 2/2017 | Bourret et al. | |
| 9,685,090 B2 | 6/2017 | Kneuper et al. | |
| 9,940,085 B2 | 4/2018 | Albert et al. | |
| 10,026,327 B2 | 7/2018 | Prenot et al. | |
| 10,318,003 B2 | 6/2019 | Gannon et al. | |
| 10,514,707 B1* | 12/2019 | Carrico | B64D 45/00 |
| 2011/0264312 A1 | 10/2011 | Spinelli et al. | |
| 2014/0222257 A1* | 8/2014 | Wyatt | G08G 5/0021 701/16 |
| 2014/0309821 A1 | 10/2014 | Poux et al. | |
| 2014/0343765 A1 | 11/2014 | Suiter et al. | |
| 2014/0365041 A1 | 12/2014 | Deker et al. | |
| 2015/0198954 A1* | 7/2015 | Riedinger | G08G 5/025 701/18 |
| 2019/0033861 A1 | 1/2019 | Groden et al. | |

* cited by examiner

GLIDING VERTICAL MARGIN GUIDANCE METHODS AND SYSTEMS

CROSS REFERENCE TO RELATED APPLICATION

This application claims priority to Indian Provisional Patent Application No. 202011023637, filed Jun. 5, 2020, the entire content of which is incorporated by reference herein.

TECHNICAL FIELD

The subject matter described herein relates generally to vehicle systems, and more particularly, embodiments of the subject matter relate to aircraft systems capable of presenting a vertical height margin associated with a landing location for an aircraft.

BACKGROUND

Pilots, air traffic controllers, airline personnel and the like routinely monitor meteorological data, reports, and forecasts to assess any potential impacts on the current or anticipated flight plan and the intended destination. However, in situations where the aircraft needs to deviate from the original plan, such as an emergency situation, the information needs to be reanalyzed with respect to the deviation to facilitate continued safe operation. For example, in the case of an emergency landing, a pilot would ideally select an airport within range of the aircraft where landing is least likely to be compromised or complicated by weather or other factors. This requires consideration of numerous pieces of information (e.g., fuel remaining and distance to be traveled, weather radar and/or forecast information, NOTAMs, SIGMETs, PIREPs, and the like), which often is distributed across different displays or instruments, requiring the pilot to mentally piece together all the different information from the different sources, while in some instances, also manually flying the aircraft concurrently. Moreover, once a diversion airport is selected, the pilot may need to further analyze the various runways at the diversion airport and determine their relative suitability for landing. Additionally, the time-sensitive nature of aircraft operation can increase the stress on the pilot, which, in turn, increases the likelihood of pilot error. Accordingly, it is desirable to reduce the mental workload of the pilot (or air traffic controller, or the like) and provide improved situational awareness in a complex situation.

BRIEF SUMMARY

Methods and systems are provided for assisting operation of an aircraft en route to an airport. One method involves identifying a reference point in advance of a runway at the airport and dynamically determining a gliding vertical trajectory for the aircraft en route to the reference point based at least in part on a current altitude of the aircraft at a current aircraft location and gliding characteristics of the aircraft. The gliding vertical trajectory results in a predicted altitude of the aircraft at a location corresponding to the reference point. The method continues by providing, on a primary flight display, a graphical indication of a difference between the predicted altitude at the location corresponding to the reference point resulting from the gliding vertical trajectory and an altitude criterion associated with the reference point. The graphical indication of the difference dynamically updates as the aircraft travels.

In another embodiment, a system is provided that includes a display device having a primary flight display rendered thereon, a data storage element to maintain information associated with a runway, a navigation system to provide a current location of an aircraft and a current altitude of the aircraft, and a processing system coupled to the display device, the data storage element and the navigation system. The processing system is configurable to identify a reference point in advance of the runway using the information associated with the runway, dynamically determine a gliding vertical trajectory for the aircraft en route to the reference point based at least in part on the current altitude of the aircraft at the current location, dynamically determine a difference between a predicted altitude of the aircraft at a location corresponding to the reference point resulting from the gliding vertical trajectory and a target altitude associated with the reference point, and provide a graphical indication of the difference between the predicted altitude and the target altitude.

In another embodiment, a flight deck display for an aircraft is provided. A primary flight display rendered on the flight deck display includes a synthetic perspective view of terrain for a region proximate the aircraft and a graphical indication of a difference between a predicted altitude at a location corresponding to a final approach reference point resulting from a gliding vertical trajectory from a current altitude and current location of the aircraft and a target altitude associated with the final approach reference point. The gliding vertical trajectory for the aircraft en route to the final approach reference point is dynamically determined based at least in part on the current altitude of the aircraft at the current location and gliding characteristics of the aircraft. The predicted altitude corresponds to an altitude of the gliding vertical trajectory at the location corresponding to the final approach reference point, and the target altitude comprises an altitude of a reference vertical trajectory at the final approach reference point. The graphical indication of the difference dynamically updates as the aircraft travels.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
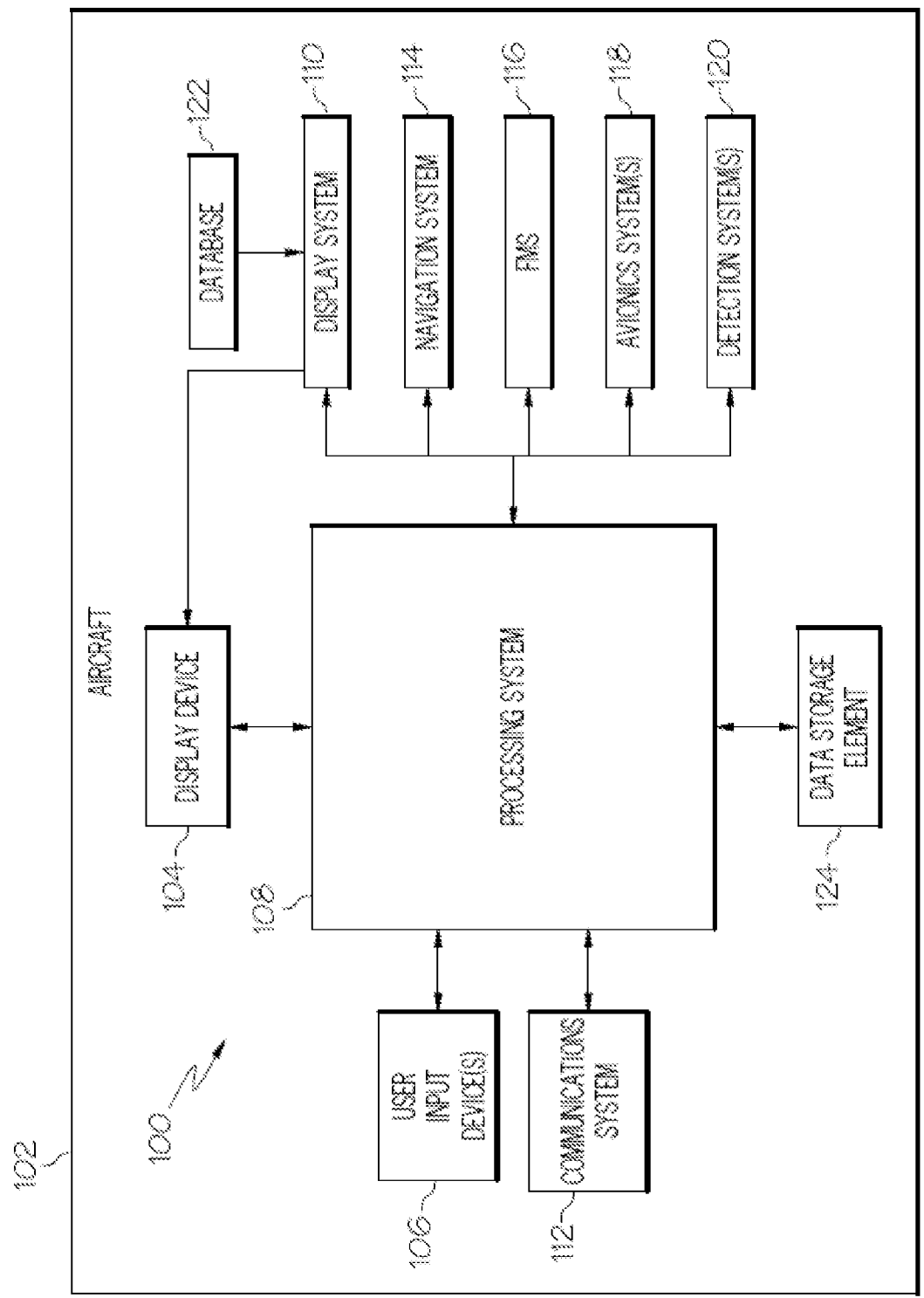
FIG. 1 is a block diagram of a system for an aircraft in an exemplary embodiment.

Embodiments of the subject matter described herein generally relate to systems and methods for assisting operation of a vehicle en route to a destination. While the subject matter described herein could be utilized in various applications or in the context of various types of vehicles (e.g., automobiles, marine vessels, trains, or the like), exemplary embodiments are described herein in the context of an aircraft being flown en route to an airport. In particular, the subject matter is described primarily in the context of a total engine flameout (TEFO) condition when the aircraft is unable to generate or otherwise provide forward thrust.

As described in greater detail below in the context of FIGS. 2-5, when a TEFO condition or a similar anomalous condition exists, a pilot, co-pilot or other crew member operating an aircraft is provided with one or more indicia of the amount of vertical height margin that exists with respect to landing the aircraft on a runway at an airport. In this regard, the vertical height margin represents the anticipated vertical distance between the anticipated altitude of the aircraft at a runway reference point resulting from a gliding trajectory and a reference altitude at the runway reference point. Thus, the vertical margin threshold indicia provides situational awareness with respect to whether or not the aircraft is likely to be able to glide and reach the airport safely in the absence of the ability to provide further thrust, thereby providing pilot or other aircraft operator with quantitative guidance of whether the airport or other landing location within the vicinity of the aircraft is viable or otherwise likely to be within the aircraft's capability. In exemplary embodiments, the vertical height margin is dynamically determined substantially in real-time to account for the current meteorological conditions, the current lift-to-drag ratio and/or sink rate of the aircraft, the current configuration of the aircraft, the current altitude of the aircraft, the current speed of the aircraft, and/or the like to account for deviations from the originally anticipated gliding trajectory during flight.

In exemplary embodiments, determining the vertical height margin for a runway at an airport involves identifying a reference point in advance of the runway representing the start of the final approach segment, such as a final approach fix or a final approach point. Based on the lateral distance between the reference point and the runway, a reference altitude criterion associated the reference point is determined by projecting a trajectory aligned with a centerline of the runway backwards from the runway that climbs with a constant flight path angle until reaching the reference point. In some embodiments, the constant flight path angle is defined by an approach procedure associated with the runway or determined based on terrain in a vicinity of the final approach segment.

After identifying the reference point and corresponding altitude criterion, an anticipated gliding trajectory from the current location of the aircraft along an anticipated lateral trajectory to the reference point is calculated or otherwise determined based on the current altitude of the aircraft, the current speed of the aircraft, the current aircraft configuration, the current lift-to-drag ratio or sink rate of the aircraft, and the like. In exemplary embodiments, the anticipated gliding trajectory also accounts for current or forecasted meteorological conditions at the current location of the aircraft or en route to the particular airport of interest. The resulting altitude of the anticipated gliding trajectory at the location where the anticipated lateral trajectory intersects or otherwise reaches the reference point represents the predicted altitude of the aircraft upon reaching the location corresponding to the reference point when flying or otherwise executing the anticipated gliding trajectory along the anticipated lateral trajectory en route to the airport. The vertical height margin associated with the runway at the airport is then calculated or otherwise determined by subtracting the reference altitude criterion associated the reference point from the predicted aircraft altitude at the reference point. In this regard, when the difference between the predicted aircraft altitude and reference altitude criterion is positive, the aircraft is likely to be able to safely reach the airport for landing at the particular runway of interest with some potential margin for error. Conversely, when the difference between the predicted aircraft altitude and reference altitude criterion is negative, the aircraft is unlikely to be able to reach the airport for landing at the particular runway of interest.

In exemplary embodiments, the vertical height margin may be calculated or otherwise determined for one or more airports within a threshold distance of the aircraft and utilized to generate or otherwise populate an airport selection graphical user interface (GUI) display that includes indicia of the estimated vertical height margin for each of the airports within the threshold distance of the aircraft to support or otherwise assist a pilot in selecting or otherwise identifying the safest airport for landing (e.g., the runway or airport with the greatest amount of vertical height margin available). In some embodiments, the graphical indicia of the estimated vertical height margin may be presented qualitatively, for example, by depicting runways or airports having a positive estimated vertical height margin using a visually distinguishable characteristic (e.g., a green color, highlighting, bolding, or the like) to indicate viability, while runways or airports having a negative estimated vertical height margin are rendered using a different visually distinguishable characteristic (e.g., a red color, fading, shading, or the like) to qualitatively indicate lack of viability.

Figure 4:
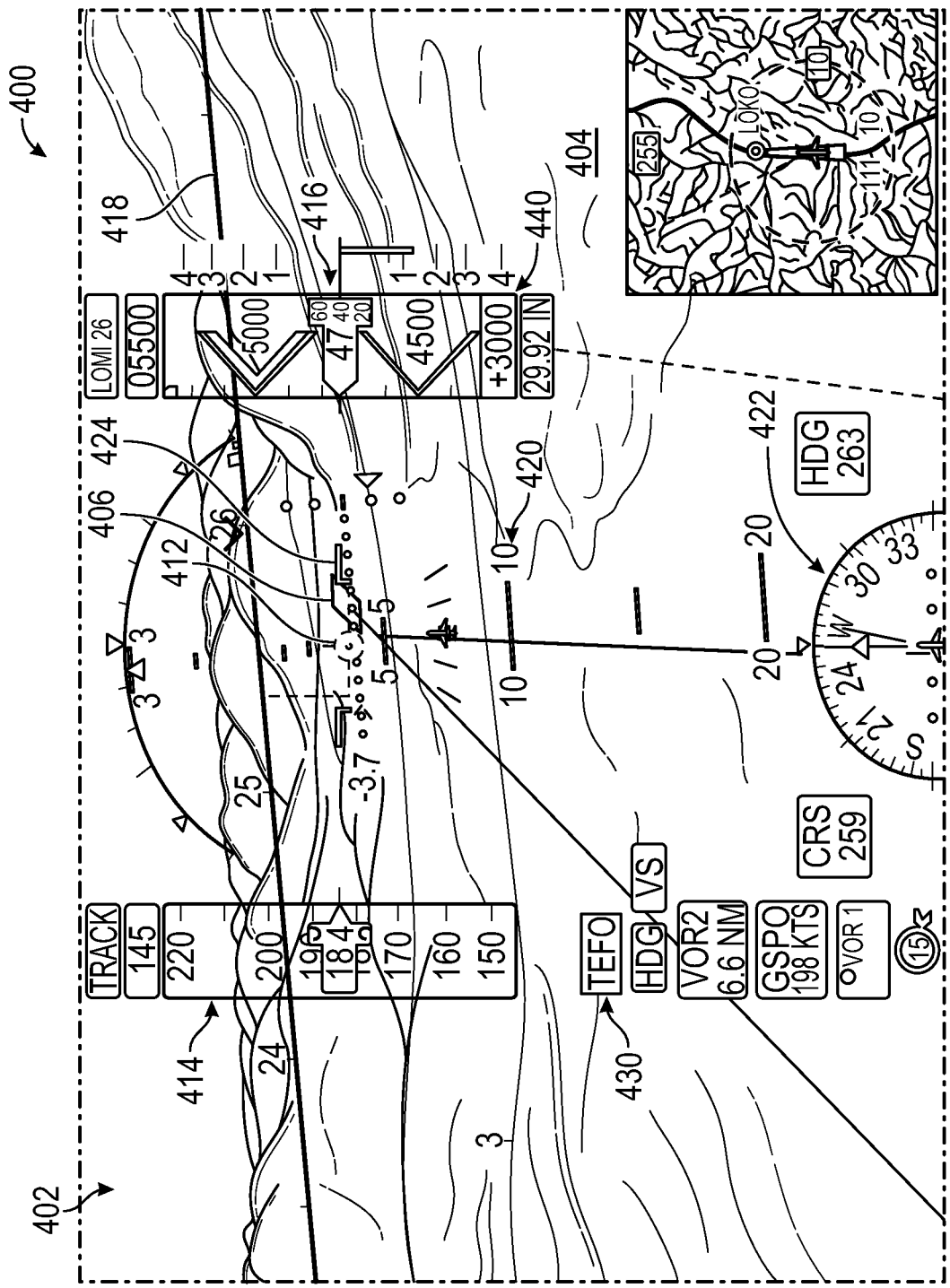
FIG. 4 depicts an exemplary flight deck display including estimated vertical margin indicia suitable for presentation in connection with the vertical margin display process of FIG. 2 in accordance with one or more embodiments.

As depicted in FIG. 4, in exemplary embodiments, one or more graphical indicia of the vertical height margin is provided on a primary flight display (PFD) or other forward-looking perspective view display to facilitate providing quantitative feedback of the vertical height margin in real-time as the aircraft travels en route to a particular airport. In this regard, as the aircraft travels, the vertical height margin may be dynamically updated and recomputed in real-time by dynamically updating the anticipated gliding trajectory to account for changes in the aircraft's speed, altitude, lift-to-drag ratio, or the like, as well as changing meteorological conditions while en route. Thus, a pilot manually flying the aircraft may adjust operation of the aircraft (e.g., by adjusting the pitch, changing the aircraft configuration, and/or the like) substantially in real-time as the amount of available vertical height margin increases or decreases while en route. In this manner, the subject matter described herein enables a pilot manually flying the aircraft to identify a viable landing location and reliably manage the vertical situation of the aircraft to facilitate safe landing of the aircraft during TEFO conditions or other anomalous conditions where the aircraft is unable to provide thrust.

Aircraft System Overview

FIG. 1 depicts an exemplary embodiment of a system 100 which may be located onboard a vehicle, such as an aircraft 102. The system 100 includes, without limitation, a display device 104, a user input device 106, a processing system 108, a display system 110, a communications system 112, a navigation system 114, a flight management system (FMS) 116, one or more avionics systems 118, one or more detection systems 120, and one or more data storage elements 122, 124 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, and the processing system 108 and the display system 110 are cooperatively configured to display, render, or otherwise convey one or more graphical representations or images associated with operation of the aircraft 102 on the display device 104, as described in greater detail below.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map. In one or more exemplary embodiments, the display system 110 accesses a synthetic vision terrain database 122 that includes positional (e.g., latitude and longitude), altitudinal, and other attribute information (e.g., terrain type information, such as water, land area, or the like) for the terrain, obstacles, and other features to support rendering a three-dimensional conformal synthetic perspective view of the terrain proximate the aircraft 102, as described in greater detail below.

As described in greater detail below, in an exemplary embodiment, the processing system 108 includes or otherwise accesses a data storage element 124 (or database), which maintains information regarding airports and/or other potential landing locations (or destinations) for the aircraft 102. In this regard, the data storage element 124 maintains an association between a respective airport, its geographic location, runways (and their respective orientations and/or directions), instrument procedures (e.g., approaches, arrival routes, and the like), airspace restrictions, and/or other information or attributes associated with the respective airport (e.g., widths and/or weight limits of taxi paths, the type of surface of the runways or taxi path, and the like). Additionally, in some embodiments, the data storage element 124 also maintains status information for the runways and/or taxi paths at the airport indicating whether or not a particular runway and/or taxi path is currently operational along with directional information for the taxi paths (or portions thereof). The data storage element 124 may also be utilized to store or maintain other information pertaining to the airline or aircraft operator (e.g., airline or operator preferences, etc.) along with information pertaining to the pilot and/or co-pilot of the aircraft (e.g., pilot preferences, experience level, licensure or other qualifications, etc.).

Still referring to FIG. 1, in an exemplary embodiment, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference). Additionally, in an exemplary embodiment, the navigation system 114 includes inertial reference sensors capable of obtaining or otherwise determining the attitude or orientation (e.g., the pitch, roll, and yaw, heading) of the aircraft 102 relative to earth.

In an exemplary embodiment, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In the illustrated embodiment, the onboard detection system(s) 120 generally represents the component(s) of the aircraft 102 that are coupled to the processing system 108 and/or the display system 110 to generate or otherwise provide information indicative of various objects or regions of interest within the vicinity of the aircraft 102 that are sensed, detected, or otherwise identified by a respective onboard detection system 120. For example, an onboard detection system 120 may be realized as a weather radar system or other weather sensing system that measures, senses, or otherwise detects meteorological conditions in the vicinity of the aircraft 102 and provides corresponding radar data (e.g., radar imaging data, range setting data, angle setting data, and/or the like) to one or more of the other onboard systems 108, 110, 114, 116, 118 for further processing and/or handling. For example, the processing system 108 and/or the display system 110 may generate or otherwise provide graphical representations of the meteorological conditions identified by the onboard detection system 120 on the display device 104 (e.g., on or overlying a lateral navigational map display). In another embodiment, an onboard detection system 120 may be realized as a collision avoidance system that measures, senses, or otherwise detects air traffic, obstacles, terrain and/or the like in the vicinity of the aircraft 102 and provides corresponding detection data to one or more of the other onboard systems 108, 110, 114, 116, 118.

In one or more embodiments, an onboard detection system 120 may include one or more imaging devices or sensors configured to capture, sense, or otherwise obtain real-time imagery corresponding to an imaging region proximate the aircraft 102, such as, for example, an infrared (IR) video camera or a millimeter wave (MMW) video camera that captures an image or frame corresponding to the imaging region at regular intervals (e.g., the refresh rate of the imaging device) for subsequent display on the display device 104, as described in greater detail below. In such embodiments, the imaging device may be mounted in or near the nose of the aircraft 102 and calibrated to align the imaging region with a particular location within a viewing region of a primary flight display rendered on the display device 104. For example, the imaging device may be configured so that the geometric center of the imaging region is aligned with or otherwise corresponds to the geometric center of the viewing region of the primary flight display. In this regard, the imaging device may be oriented or otherwise directed substantially parallel an anticipated line-of-sight for a pilot and/or crew member in the cockpit of the aircraft 102 to effectively capture a forward looking cockpit view of the imaging region.

In the illustrated embodiment, the processing system 108 is also coupled to the communications system 112, which is configured to support communications to and/or from the aircraft 102 via a communications network. For example, the communications system 112 may also include a data link system or another suitable radio communication system that supports communications between the aircraft 102 and one or more external monitoring systems, air traffic control, and/or another command center or ground location. In this regard, the communications system 112 may allow the aircraft 102 to receive information that would otherwise be unavailable to the pilot and/or co-pilot using the onboard systems 114, 116, 118, 120. For example, the communications system 112 may receive meteorological information from an external weather monitoring system, such as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. The meteorological information provided by an external weather monitoring system may also include forecast meteorological data that is generated based on historical trends and/or other weather observations, and may include forecasted meteorological data for geographical areas that are beyond the range of any weather detection systems 120 onboard the aircraft 102. In other embodiments, the processing system 108 may store or otherwise maintain historical meteorological data previously received from an external weather monitoring system, with the processing system 108 calculating or otherwise determining forecast meteorological for geographic areas of interest to the aircraft 102 based on the stored meteorological data and the current (or most recently received) meteorological data from the external weather monitoring system. In this regard, the meteorological information from the external weather monitoring system may be operationally used to obtain a "big picture" strategic view of the current weather phenomena and trends in its changes in intensity and/or movement with respect to prospective operation of the aircraft 102.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag that is separate from the aircraft 102 but capable of being communicatively coupled to the other elements of the aircraft system 100 when onboard the aircraft 102. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, features and/or functionality of processing system 108 described herein can be implemented by or otherwise integrated with the features and/or functionality provided by the display system 110 or the FMS 116, or vice versa. In other words, some embodiments may integrate the processing system 108 with the display system 110 or the FMS 116; that is, the processing system 108 may be a component of the display system 110 and/or the FMS 116.

Vertical Height Margin Situational Awareness

Figure 2:
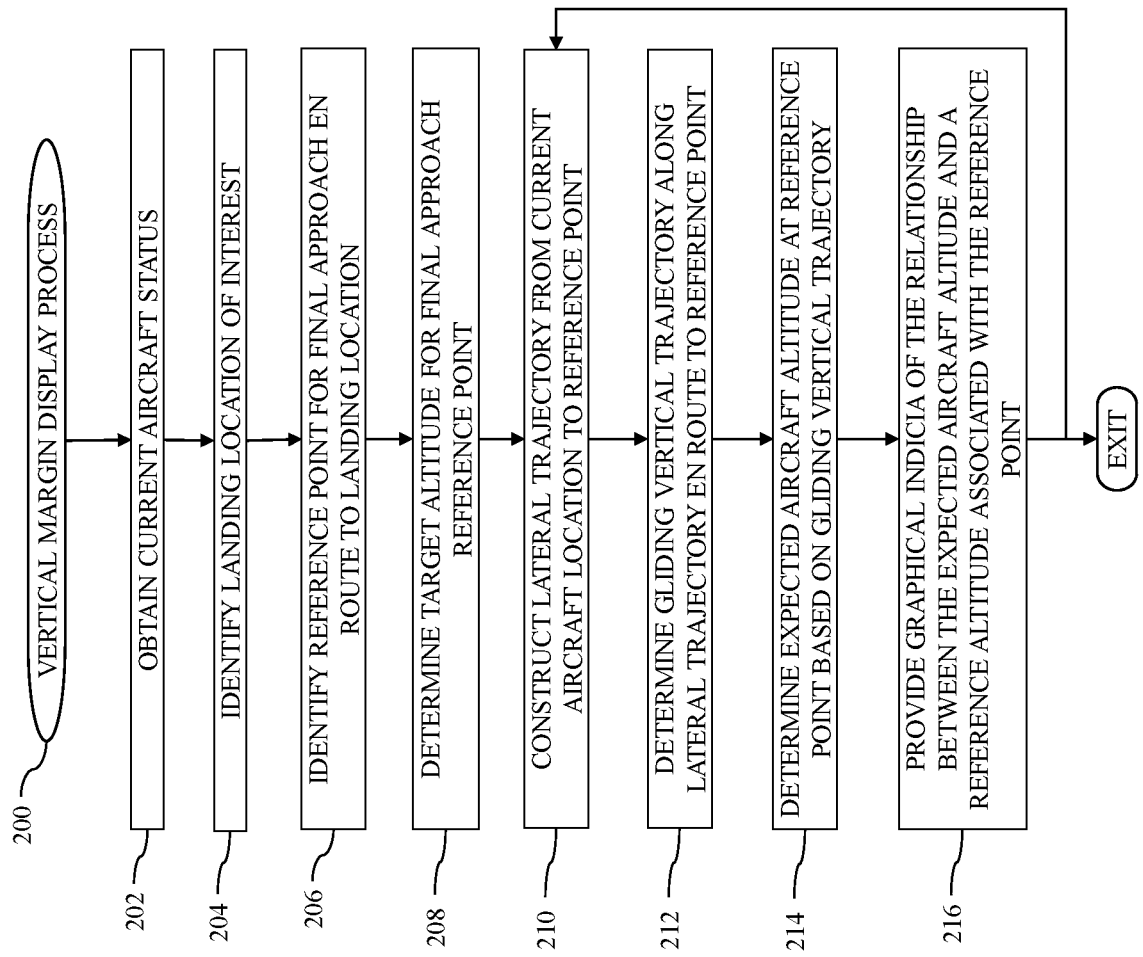
FIG. 2 is a flow diagram of an exemplary vertical margin display process suitable for use with the aircraft in the system of FIG. 1 in accordance with one or more embodiments.

Referring now to FIG. 2, in an exemplary embodiment, the aircraft system 100 is configured to support a vertical margin display process 200 to display, present, or otherwise provide graphical indicia of the relationship between a predicted aircraft altitude in advance of a landing location and a reference altitude for the landing location and perform additional tasks, functions, and operations described below. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the vertical margin display process 200 may be performed by different elements of the system 100, such as, the processing system 108, the display system 110, the communications system 112, the navigation system 114, the FMS 116, the onboard avionics systems 118 and/or the onboard detection systems 120. It should be appreciated that the vertical margin display process 200 may include any number of additional or alternative tasks, the tasks need not be performed in the illustrated order and/or the tasks may be performed concurrently, and/or the vertical margin display process 200 may be incorporated into a more comprehensive procedure or process having additional functionality not described in detail herein. Moreover, one or more of the tasks shown and described in the context of FIG. 2 could be omitted from a practical embodiment of the vertical margin display process 200 as long as the intended overall functionality remains intact.

Still referring to FIG. 2, and with continued reference to FIG. 1, in an exemplary embodiment, the illustrated vertical margin display process 200 begins by receiving or otherwise obtaining current status information pertaining to the aircraft (task 202). The current status information pertaining to the aircraft 102 generally represents the instantaneous, real-time or most recent available values for one or more parameters that quantify the current operation of the aircraft 102. For example, the processing system 108 may obtain (e.g., from FMS 116, navigation system 114 and/or other avionic systems 118) one or more of the following: the current location of the aircraft 102, the current altitude (or above ground level) of the aircraft 102, the current heading (or bearing) of the aircraft 102, the current amount of fuel remaining onboard the aircraft 102, the current engine status, the current aircraft configuration (e.g., the current flap configuration, the current landing gear configuration, and/or the like). Additionally, the processing system 108 may obtain, either from the onboard detection systems 120 or an external system via communications system 112, current meteorological conditions at or near the current location of the aircraft 102 (e.g., the current temperature, wind speed, wind direction, atmospheric pressure, turbulence, and the like).

The vertical margin display process 200 continues by identifying or otherwise determining a potential landing location for analysis (task 204). In some embodiments, the vertical margin display process 200 may identify the runway at the destination airport set forth in the flight plan programmed into the FMS 116 as the landing location to be analyzed. In other embodiments, in the event of a diversion or another situation where the aircraft needs to deviate from the original flight plan, such as an emergency situation, the vertical margin display process 200 may automatically identify one or more airports within a vicinity of the aircraft for analysis. For example, by default, the processing system 108 and/or the FMS 116 may utilize the current location of the aircraft 102 to identify the closest airport to the current location of the aircraft 102 from a database 122 for analysis. As described in greater detail below in the context of FIG. 5, in some embodiments, the vertical margin display process 200 is performed with respect to any airports identified within a geographic area of interest, such as the geographic area corresponding to the currently displayed area of a navigational map on the display device 104, a geographic area within a threshold distance of the current aircraft location, a user-selected geographic area, and/or the like. For example, as described in U.S. Pat. No. 10,096,253, the processing system 108 and/or the FMS 116 may generate an airport selection graphical user interface (GUI) display on the display device 104 that depicts airports within a vicinity of the aircraft 102 for analysis and selection by a pilot, co-pilot or other crew member in the event of a diversion. A pilot may utilize his or her discretion to select or otherwise indicate the desired runway at his or her desired airport based on any number of factors (e.g., the estimated landing weight and/or required runway length, etc.).

After identifying the landing location of interest, the vertical margin display process 200 identifies or otherwise determines the location of a reference point in advance of the landing location that defines or otherwise demarcates a final approach segment en route to the landing location (task 206). In this regard, the final approach reference point represents the location in advance of landing at the runway at which the aircraft is aligned with the runway heading (or centerline) and the aircraft configuration would be expected to be adjusted for landing at the runway (e.g., flap extension, landing gear deployment, etc.). In one or more embodiments, the processing system 108 and/or the FMS 116 utilizes an airport database 122 to identify the geographic location associated with a final approach fix associated with a runway at the airport of interest which defines the final approach segment aligned with the runway heading (or runway centerline). In other embodiments, in the absence of a defined final approach fix for a given runway or airport, the processing system 108 and/or the FMS 116 may calculate or otherwise determine a final approach reference point for a final approach segment by projecting a segment aligned with the runway backwards towards the current location of the aircraft by a predetermined distance (e.g., 1 nautical mile).

After identifying the location of a final approach reference point, the vertical margin display process 200 calculates or otherwise determines a target altitude for the aircraft upon reaching the final approach reference point (task 208). In exemplary embodiments, the vertical margin display process 200 generates or otherwise constructs a vertical trajectory that climbs at a constant flight path angle (e.g., 3° from the horizontal) backwards from the runway at the airport until reaching the location of the final approach reference point. In practice, the flight path angle may vary depending on the runway and/or airport, for example, if terrain or approach procedures associated with a particular runway prescribes a particular flight path angle. Otherwise, a standard default angle of 3° from the horizontal may be utilized.

Still referring to FIG. 2, the vertical margin display process 200 constructs or otherwise determines a lateral trajectory from the current location of the aircraft to the location of the final approach reference point, and then calculates or otherwise determines a gliding vertical trajectory for the aircraft along the lateral trajectory using gliding characteristics associated with the aircraft (tasks 210, 212). In exemplary embodiments, the processing system 108 and/or FMS 116 identifies a lateral trajectory that includes one or more segments between the current geographic location of the aircraft 102 and the location associated with the final approach reference point. The lateral trajectory accounts for the turning radius of the aircraft 102 and provides a feasible lateral trajectory that the aircraft 102 is capable of flying given the aircraft's current airspeed, the current aircraft configuration, and potentially other factors (e.g., meteorological conditions or the like).

Once the lateral trajectory is determined, the processing system 108 and/or the FMS 116 calculates or otherwise determines the gliding vertical trajectory that represents the expected behavior or performance of the aircraft 102 vertically while gliding along the lateral trajectory. The gliding vertical trajectory starts at the current altitude of the aircraft 102 at the current location of the aircraft and descends along the lateral trajectory en route to the final approach reference point at a rate that reflects the gliding characteristics of the aircraft 102, such as, for example, the optimal glide speed for the aircraft 102 that minimizes the sink rate, the current sink rate (or lift-to-drag ratio) for the aircraft, the current weight of the aircraft 102, the current configuration of the aircraft 102, and/or the like. In exemplary embodiments, the processing system 108 and/or the FMS 116 identifies or otherwise determines the current sink rate (or lift-to-drag ratio) and projects the gliding vertical trajectory forward from the current aircraft altitude and location by initially using the current sink rate and current speed of the aircraft 102 and constructing a descent path that reflects the current and/or anticipated airspeed, sink rate, winds, and/or the like while en route to the final approach reference point and assuming the current aircraft configuration state is maintained until reaching the final approach reference point. In various embodiments, the vertical margin display process 200 also identifies or otherwise obtains forecasted or real-time meteorological information associated with the runway (e.g., via communications system 112), the current location of the aircraft (e.g., via an onboard detection system 120), or other navigational reference points or geographic areas relevant to the lateral trajectory so that the resulting gliding vertical trajectory accounts for meteorological impacts on the descent of the aircraft 102 (e.g., wind speed and direction, etc.). For example, a tailwind or headwind along the anticipated flight path can increase or decrease the airspeed above or below the optimal gliding speed and thereby increase the sink rate and reduce the predicted altitude at the final approach reference point.

After constructing the gliding vertical trajectory en route to the final approach reference point, the vertical margin display process 200 identifies or otherwise determines the predicted altitude of the aircraft expected upon arrival at the final approach reference point in accordance with the gliding vertical trajectory (task 214). In this regard, the processing system 108 and/or the FMS 116 identifies the altitude along the gliding vertical trajectory at the geographic location of the final approach reference point that is expected to result from the aircraft 102 gliding from its current location en route to the final approach reference point along the lateral trajectory. The vertical margin display process 200 generates or otherwise provides a graphical indication of the difference between the predicted aircraft altitude at the final approach reference point and the target altitude at the final approach reference point (task 216). For example, the processing system 108 and/or the FMS 116 may subtract the target altitude from the predicted aircraft altitude at the final approach reference point and provide a graphical representation of the estimated vertical height margin available to the aircraft 102. In some embodiments, the processing system 108 and/or the FMS 116 may provide qualitative indicia of whether the estimated vertical height margin is positive or negative, for example, by rendering the runway or airport using one visually distinguishable characteristic to indicate when sufficient margin exists (e.g., a green color when the estimated vertical height margin is positive) and a different visually distinguishable characteristic when the estimated vertical height margin is insufficient (e.g., a red color when the estimated vertical height margin is negative). Thus, a pilot, co-pilot, or other crew member operating the aircraft 102 may be quickly apprised of the anticipated vertical situation of the aircraft 102 with respect to landing at the particular runway or airport of interest and manually fly the aircraft 102 in a manner that is informed by the estimated vertical height margin.

For example, the estimated vertical height margin appears to be too high, the pilot can take actions to increase the descent rate (e.g., by increasing speed above the glide speed) or alter the lateral flight path (e.g., by adding turns closer to the runway) to increase the lateral distance to be traveled and thereby reduce the estimated vertical height margin upon reaching the reference point. Conversely, if the estimated vertical height margin is too low, the pilot may jettison fuel or initiate other actions to decrease the descent rate or otherwise alter the aircraft trajectory to attempt to increase the vertical height margin (or alleviate the potential absence thereof).

In exemplary embodiments, the vertical margin display process 200 continually repeats the loop defined by tasks 210, 212, 214 and 216 to dynamically update the graphical indicia of the vertical height margin as the aircraft 102 travels en route to a particular airport. In this regard, as the manually flown aircraft 102 deviates from the previously determined lateral trajectory or gliding vertical trajectory, the estimated vertical height margin is dynamically updated to reflect the changing state of the aircraft 102 and provide feedback to the pilot, co-pilot, or other crew member operating the aircraft 102 regarding the vertical situation of the aircraft 102 with respect to landing at the particular runway or airport of interest. Thus, the pilot can dynamically adjust manual flight of the aircraft 102 substantially in real-time in response to fluctuations in the estimated vertical height margin and take anticipatory actions that are likely to improve future operation of the aircraft 102 with respect to landing at the airport.

Figure 3:
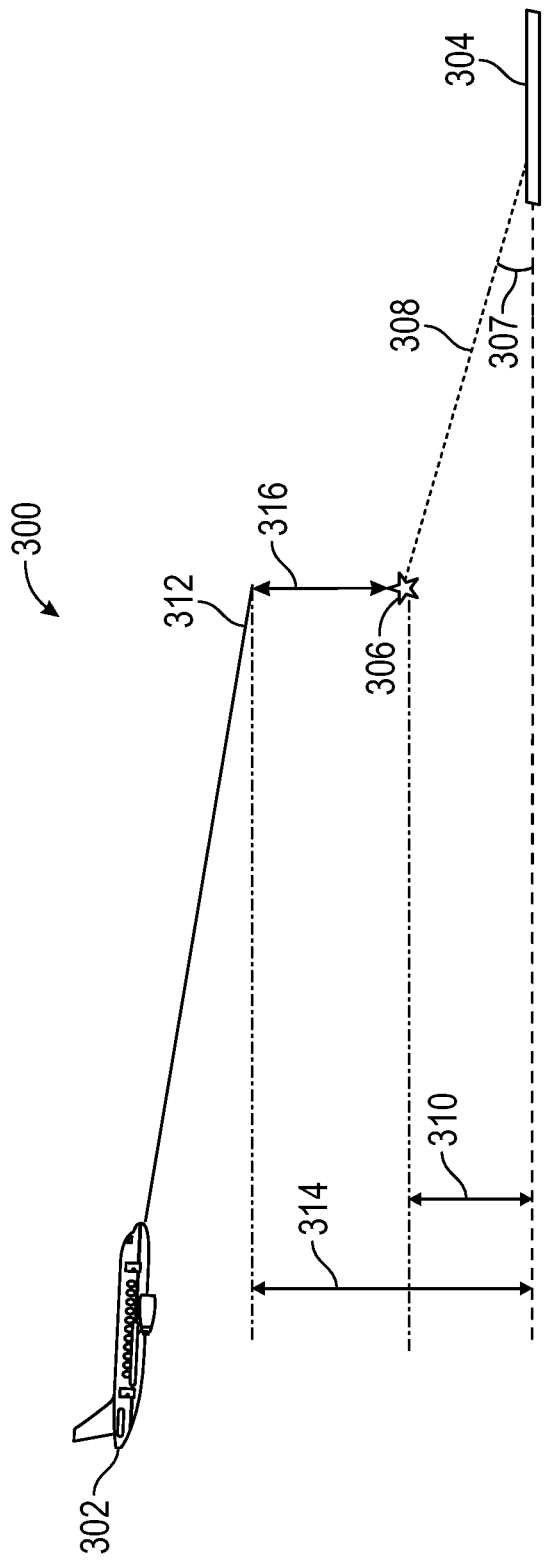
FIG. 3 depicts an exemplary vertical profile depicting an estimated vertical margin resulting from a gliding vertical trajectory constructed in connection with the vertical margin display process of FIG. 2 in accordance with one or more embodiments.

FIG. 3 depicts an exemplary vertical profile 300 depicting the relationship between a gliding vertical trajectory and a final approach reference point in connection with an exemplary embodiment of the vertical margin display process 200. As described above, after identifying a runway 304 at an airport of interest in a vicinity of the aircraft 302, the vertical margin display process 200 identifies the location for a final approach reference point 306 in advance of the runway 304 and constructs a reference vertical trajectory 308 backwards along the runway heading from the runway 304 to the approach reference point 306 at a constant flight path angle 307 to arrive at a target altitude 310 at the final approach reference point 306. The vertical margin display process 200 then calculates or otherwise determines a gliding vertical trajectory 312 that descends from the current altitude of the aircraft 302 at the current location of the aircraft 302 in a manner that is influenced based at least in part on the current aircraft speed, the current sink rate, the current aircraft configuration, and/or other factors as described above to arrive at a predicted aircraft altitude 314 upon reaching the final approach reference point 306 when being flown manually and gliding en route from the current aircraft location to the final approach reference point 306 along the expected lateral trajectory. In this regard, the lateral distance associated with the gliding vertical trajectory between the current location of the aircraft 302 and the final approach reference point 306 corresponds to the lateral distance associated with the constructed lateral trajectory between the current aircraft location and the final approach reference point 306. The vertical margin display process 200 calculates or otherwise determines the estimated vertical height margin 316 for landing at the runway 304 by subtracting the target approach altitude 310 from the predicted aircraft altitude 314. Graphical indicia of the magnitude and/or sign of the estimated vertical height margin 316 may then be provided on the display device 104 to indicate to the pilot that sufficient vertical height margin is expected for the runway 304.

Referring now to FIG. 4, and with continued reference to FIGS. 1-3, in one or more exemplary embodiments, the processing system 108 and the display system 110 are cooperatively configured to control the rendering of a flight deck display 400 on the display device 104 and provide graphical indicia of the estimated vertical height margin on the flight deck display 400. In an exemplary embodiment, the flight deck display 400 includes a primary flight display 402 capable of being utilized by a pilot or other user for guidance with respect to manually flying the aircraft 102, that is, the pilot's primary reference for flight information (e.g., speed and altitude indicia, attitude indicia, lateral and vertical deviation indicia, mode annunciations, and the like). It should be appreciated that flight deck display 400 as depicted in FIG. 4 represents the state of a dynamic display frozen at one particular time, and that the flight deck display 400 may be continuously refreshed during operation as the aircraft 102 travels to reflect changes in the attitude, altitude and/or position of the aircraft 102 with respect to the Earth.

In the illustrated embodiment, the primary flight display 402 includes several features that are graphically rendered, including, without limitation a synthetic perspective view of terrain 204, a reference symbol 412 corresponding to the current flight path of the aircraft 102, an airspeed indicator 414 (or airspeed tape) that indicates the current airspeed of the aircraft 102, an altitude indicator 416 (or altimeter tape) that indicates the current altitude of the aircraft 102, a zero pitch reference line 418, a pitch ladder scale 420, a compass 422, and an aircraft reference symbol 424, as described in greater detail below. The embodiment shown in FIG. 4 has been simplified for ease of description and clarity of illustration—in practice, embodiments of the primary flight display 402 may also contain additional graphical elements corresponding to or representing pilot guidance elements, waypoint markers, flight plan indicia, flight data, numerical information, trend data, and the like. For the sake of clarity, simplicity, and brevity, the additional graphical elements of the primary flight display 402 will not be described herein.

In an exemplary embodiment, the terrain 404 is based on a set of terrain data that corresponds to a viewing region proximate the current location of aircraft 102 that corresponds to the forward-looking cockpit viewpoint from the aircraft 102. As described above, the processing system 108 and/or the display system 110 includes or otherwise accesses a terrain database 122, and in conjunction with navigational information (e.g., latitude, longitude, and altitude) and orientation information (e.g., aircraft pitch, roll, heading, and yaw) from one or more onboard avionics systems 112, 114, 116, 118, 120, the processing system 108 and/or the display system 110 controls the rendering of the terrain 404 on the display device 104 and updates the set of terrain data being used for rendering as needed as the aircraft 102 travels. As shown, in an exemplary embodiment, the processing system 108 and/or the display system 110 renders the terrain 204 in a perspective or three dimensional view that corresponds to a flight deck (or cockpit) viewpoint. In other words, terrain 404 is displayed in a graphical manner that simulates the flight deck viewpoint, that is, the vantage point of a person in the cockpit of the aircraft (e.g., a line of sight aligned with a longitudinal axis of the aircraft). Thus, features of terrain 404 are displayed in a conformal manner, relative to the Earth. For example, the relative elevations and altitudes of features in terrain 404 are displayed in a virtual manner that emulates reality. Moreover, as the aircraft 102 navigates (e.g., turns, ascends, descends, rolls, etc.), the graphical representation of terrain 404 and other features of the perspective display can shift to provide a continuously updated virtual representation for the flight crew that reflects the current state of the aircraft 102 with respect to the Earth. It should be appreciated that the perspective view associated with primary flight display 402 need not always include a perspective view of terrain 404. For example, in the absence of terrain data, the perspective view of the display may appear flat, blank, or otherwise void of conformal terrain graphics.

In the illustrated embodiment, the primary flight display 402 and/or the terrain 404 includes a graphical representation of a runway 406 (e.g., a runway outline) that the aircraft 102 is en route to. In this regard, the runway indicator 406 is depicted with respect to the terrain 404 in a manner that reflects the altitude of the runway and the orientation of the runway heading with respect to the surrounding terrain 404.

As illustrated in FIG. 4, the flight path reference symbol 412, the airspeed indicator 414, the altitude indicator 416, the zero pitch reference line 418, the pitch ladder scale 420, the compass 422, and the aircraft reference symbol 424 are displayed or otherwise rendered overlying the terrain 404. During flight, the flight path reference symbol 412 moves within primary flight display 402 such that it generally indicates the direction the aircraft 102 is currently moving. The pitch ladder scale 420 includes a number of parallel marks and/or alphanumeric characters that indicate the pitch of the aircraft 102 relative to a reference orientation for the body of the aircraft 102 using any convenient scale, where a pitch angle of zero degrees with respect to the reference orientation for the body of the aircraft 102 (i.e., zero pitch on pitch ladder scale 420) corresponds to the zero pitch reference line 418. In an exemplary embodiment, the zero pitch reference line 418 is rendered in a conformal manner such that it moves (up and down) and rotates (clockwise and counterclockwise) within the primary flight display 402 in accordance with the current orientation (e.g., pitch, roll, and yaw) of the aircraft 102. In this regard, the rendering and display of zero pitch reference line 418 is influenced by the actual zero pitch orientation of the aircraft. It will be appreciated that the zero pitch reference line 418 generally corresponds to an artificial horizon line (e.g., an angle of zero degrees for the aircraft 102 nose to pitch up or down with respect to the real horizon parallel to the local earth surface), such that portions of the primary flight display 402 (e.g., portions of terrain 404) above the zero pitch reference line 418 correspond to real-world features that are above the current altitude of the aircraft 102 portions of the primary flight display 402 below the zero pitch reference line 418 correspond to real-world features that are below the current altitude of the aircraft 102. Thus, the zero pitch reference line 418 may be utilized to discern relative altitude and/or attitude of the terrain 404 with respect to the aircraft 102. Markings of pitch ladder scale 420 that appear above zero pitch reference line 418 correspond to positive pitch of the aircraft, and markings of pitch ladder scale 420 that appear below zero pitch reference line 418 correspond to negative pitch of the aircraft. The "intersection" of an aircraft reference symbol 424 with pitch ladder scale 420 represents the current pitch of the aircraft 102, as indicated on pitch ladder scale 420.

Still referring to FIG. 4, in exemplary embodiments, when the vertical margin display process 200 is active, the primary flight display 402 includes a graphical indication 430 that the primary flight display 402 is in a display mode other than a normal or managed operating mode. For example, in one or more embodiments, the vertical margin display process 200 may be automatically initiated in response to the processing system 108 and/or the FMS 116 detecting a TEFO condition, with the primary flight display 402 being automatically updated to include a TEFO display mode indicator 430 that notifies the pilot or other aircraft operator of the automated change to the primary flight display 402.

In the TEFO display mode, the processing system 108 generates or otherwise provides a graphical indication 440 of the estimated vertical height margin calculated with respect to a final approach reference point in advance of the runway 406 in accordance with the vertical margin display process 200 of FIG. 2 as described above. In this regard, the estimated vertical height margin indicator 440 includes a graphical representation of the estimated vertical height margin (e.g., vertical height margin 316) corresponding to the difference between the altitude of the aircraft 102 expected to result from a gliding trajectory (e.g., vertical gliding trajectory 312) en route to the final approach navigational reference point in advance of the runway 406, thereby providing the pilot or other aircraft operator with quantitative feedback regarding the current state of the aircraft 102 with respect to landing at the runway 406. Additionally, in exemplary embodiments, the estimated vertical height margin indicator 440 is rendered in different visually distinguishable characteristics depending on whether the estimated vertical height margin is positive or negative to provide qualitative feedback regarding the current state of the aircraft 102 with respect to landing at the runway 406. For example, the estimated vertical height margin depicted within the estimated vertical height margin indicator 440 may be rendered using blue when it is positive or rendered in red when the estimated vertical height margin is negative. The visually distinguishable or distinctive characteristics are preferably chosen to allow a pilot or crew member to quickly and intuitively ascertain the qualitative state of the aircraft 102 (e.g., without requiring prolonged focus on the indicator). While the subject matter is described herein in the context of the visually distinguishable characteristic being a color, depending on the embodiment, the "visually distinguishable characteristics" or "visually distinctive characteristics" may be realized by using one more of the following characteristics, individually or in any combination thereof: different colors, different hues, different tints, different levels of transparency, translucency, opacity, contrast, brightness, or the like, different shading, texturing, and/or other graphical effects.

In exemplary embodiments, the estimated vertical height margin indicator 440 is positioned on the primary flight display 402 adjacent to the altitude indicator 416, so that the pilot can conveniently reference the estimated vertical height margin indicator 440 when evaluating the current altitude of the aircraft 102. As described above in the context of FIG. 2, during flight en route to the runway 406, the gliding vertical trajectory 312 is dynamically updated as the aircraft 102 travels to reflect changes to the altitude, location, and/or speed of the aircraft 102 substantially in real-time, which, in turn, results in the estimated vertical height margin 316 depicted within the estimated vertical height margin indicator 440 being correspondingly updated to provide the pilot with feedback substantially in real-time. Thus, by virtue of the improved situational awareness provided by the estimated vertical height margin indicator 440, a pilot can quickly ascertain how manual operation of the aircraft 102 is influencing the ability of landing at the runway 406 and proactively respond to changes in real-time to improve the likelihood of a safe landing at the runway 406 under a TEFO condition or other anomalous condition of the aircraft 102. For example, a pilot may utilize the estimated vertical height margin indicator 440 to manually fly the aircraft 102 in a manner that results in the estimated vertical height margin converging towards a value of zero upon reaching the final approach reference point (e.g., to avoid having either excess energy upon landing or insufficient energy to land at the runway). In this regard, when the estimated vertical height margin toggles from positive to negative or vice versa, the estimated vertical height margin indicator 440 dynamically updates to provide qualitative and quantitative feedback of any manual overcorrections substantially in real-time.

Figure 5:
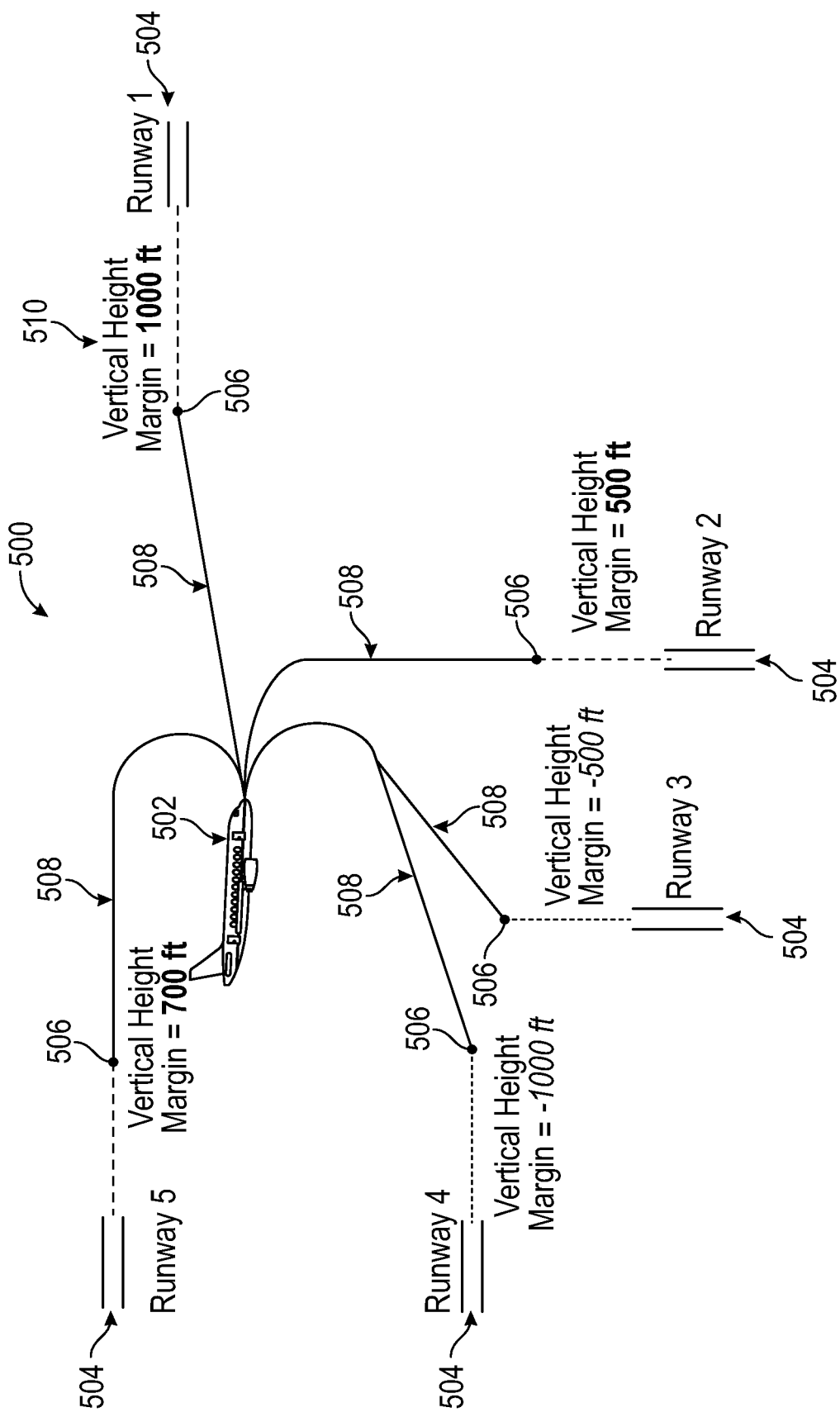
FIG. 5 depicts an exemplary airport selection graphical user interface (GUI) display suitable for presentation on a display device in the aircraft system of FIG. 1 in conjunction with the vertical margin display process of FIG. 2 in accordance with one or more embodiments.

FIG. 5 depicts an exemplary airport selection GUI display 500 that may be presented in accordance with one or more embodiments of the vertical margin display process 200 of FIG. 2. For example, in response to the processing system 108 and/or the FMS 116 detecting a TEFO condition or other anomalous condition, the processing system 108 may automatically update a lateral map display (or navigational map display) to include graphical representations of different airports 504 within a currently displayed geographic area around the current location of the aircraft 502 from which the pilot may select a desired diversion airports, in a similar manner as described in U.S. Pat. No. 10,096,253.

For each potential airport within a threshold distance of the current location of the aircraft 502 defined by the currently displayed geographic area, the vertical margin display process 200 identifies a respective final approach reference point 506 in advance of the respective airport 504, identifies a target altitude at the respective final approach reference point 506, constructs a respective lateral trajectory 508 en route to the respective final approach reference point 506, and determines respective gliding vertical trajectory en route to the respective final approach reference point 506 along the respective lateral trajectory 508 for each respective airport 504 (e.g., tasks 206, 208, 210, 212). For each respective airport 504, an estimated vertical height margin associated with the respective airport 504 is determined based on the difference between the predicted aircraft altitude resulting from the gliding vertical trajectory en route to the respective final approach reference point 506 for that airport 504 and the identified target altitude at the respective final approach reference point 506 for that airport 504 (e.g., task 214). A graphical indication 510 of the estimated vertical height margin associated with each respective airport 504 is depicted adjacent to or otherwise in visual association with the graphical representation of the respective reference point 506 and/or the graphical representation of the respective airport 504 (e.g., task 216), thereby allowing the pilot to concurrently assess and analyze the potentially available (or unavailable) vertical height margin with respect to each of the airports 504 in a vicinity of the aircraft. In this regard, the qualitative feedback provided by rendering the estimated vertical height margin indicator 510 using different visually distinguishable characteristics may allow the pilot to quickly identify the subset of the airports 504 that are most likely to be viable, and from which the pilot may then utilize the quantitative estimated vertical height margin, potentially in addition to other factors, to identify or otherwise select the airport 504 that the pilot would like to select. Upon selection of a particular airport 504, the primary flight display rendered on the display device 104 onboard the aircraft 102 may then automatically update to the TEFO display mode to depict the estimated vertical height margin for the selected airport and dynamically update the estimated vertical height margin while the pilot navigates the aircraft 102 en route to the selected airport 504.

For the sake of brevity, conventional techniques related to approach procedures, aerodynamics, aircraft modeling, graphics and image processing, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of assisting operation of an aircraft, the method comprising:
   identifying a reference point in advance of a runway at an airport;
   dynamically determining an anticipated lateral trajectory from a current aircraft location to a location corresponding to the reference point, wherein the anticipated lateral trajectory deviates from a flight plan;
   dynamically determining an estimated vertical height margin representing an anticipated vertical difference between an altitude criterion associated with the reference point and an anticipated altitude of the aircraft at the reference point resulting from a gliding vertical trajectory for the aircraft descending along the anticipated lateral trajectory gliding en route to the reference point forward from a current altitude of the aircraft at the current aircraft location for a lateral distance corresponding to the anticipated lateral trajectory; and
   providing, on a primary flight display, an estimated vertical margin indicator indicative of the estimated vertical height margin, wherein the estimated vertical margin indicator dynamically updates as the aircraft deviates from at least one of the anticipated lateral trajectory and the gliding vertical trajectory, wherein the estimated vertical height margin decreases as the aircraft deviates from the anticipated lateral trajectory to increase the lateral distance.

2. The method of claim 1, further comprising determining the altitude criterion associated with the reference point by constructing a reference vertical trajectory having a constant flight path angle backwards from the runway to the reference point, wherein the altitude criterion comprises an altitude of the reference vertical trajectory at a distance in advance of the runway corresponding to the location of the reference point.

3. The method of claim 1, wherein identifying the reference point comprises identifying a final approach fix associated with the runway using a procedure database.

4. The method of claim 3, further comprising determining the altitude criterion associated with the reference point by constructing a reference vertical trajectory having a constant flight path angle backwards from the runway to the final approach fix, wherein the altitude criterion comprises a target altitude at the final approach fix identified as an altitude of the reference vertical trajectory at a distance in advance of the runway corresponding to the location of the final approach fix.

5. The method of claim 1, wherein providing the estimated vertical margin indicator comprises rendering the estimated vertical margin indicator in a visually distinguishable characteristic influenced by a sign of the anticipated vertical difference between the anticipated altitude of the aircraft at the reference point and the altitude criterion associated with the reference point.

6. The method of claim 1, wherein displaying the estimated vertical margin indicator comprises displaying the estimated vertical margin indicator including a graphical representation of the anticipated vertical difference adjacent to an altitude indicator on the primary flight display.

7. The method of claim 6, further comprising: detecting a total engine flameout condition prior to displaying the estimated vertical margin indicator on the primary flight display; and in response to detecting the total engine flameout condition, providing a second graphical indication of a total engine flameout display mode on the primary flight display concurrent to displaying the estimated vertical margin indicator.

8. The method of claim 1, wherein the estimated vertical height margin increases or decreases as a descent rate the aircraft deviates from a sink rate corresponding to the gliding vertical trajectory.

9. The method of claim 8, wherein the gliding vertical trajectory comprises a descent path constructed using the sink rate en route to the reference point along the anticipated lateral trajectory between the current aircraft location and the reference point.

10. The method of claim 8, wherein the gliding vertical trajectory corresponds to the aircraft traveling the lateral distance corresponding to the anticipated lateral trajectory en route from the current aircraft location to the reference point descending from the current altitude at the current aircraft location at a rate that reflects the sink rate of the aircraft.

11. The method of claim 1, wherein the gliding vertical trajectory starts at the current altitude of the aircraft at the current location of the aircraft and descends along the anticipated lateral trajectory en route to the final approach reference point at a rate that reflects gliding characteristics of the aircraft.

12. The method of claim 1, wherein the gliding vertical trajectory accounts for current or forecasted meteorological conditions en route to the airport.

13. The method of claim 1, wherein the airport comprises a diversion airport.

14. A system comprising:
a display device having a primary flight display rendered thereon;
a data storage element to maintain information associated with a runway;
a navigation system to provide a current location of an aircraft and a current altitude of the aircraft; and
a processing system coupled to the display device, the data storage element and the navigation system to:
identify a reference point in advance of the runway at an airport using the information associated with the runway;
dynamically determine an anticipated lateral trajectory from the current location to a location corresponding to the reference point, wherein the anticipated lateral trajectory deviates from a flight plan;
dynamically determine an estimated vertical height margin representing an anticipated vertical difference between a target altitude associated with the reference point and a predicted altitude of the aircraft at the location corresponding to the reference point resulting from a gliding vertical trajectory for the aircraft descending along the anticipated lateral trajectory gliding en route to the reference point forward from a current altitude of the aircraft at the current aircraft location for a lateral distance corresponding to the anticipated lateral trajectory; and
command the display device to provide an estimated vertical margin indicator indicative of the estimated vertical height margin, wherein the estimated vertical margin indicator dynamically updates as the aircraft deviates from at least one of the anticipated lateral trajectory and the gliding vertical trajectory, wherein the estimated vertical height margin decreases as the aircraft deviates from the anticipated lateral trajectory to increase the lateral distance.

15. The system of claim 14, wherein: the information associated with the runway includes a heading associated with a centerline of the runway; and the processing system is configurable to: construct a reference vertical trajectory having a constant flight path angle backwards from the runway to the reference point along the heading associated with the centerline of the runway; and identify the target altitude as an altitude of the reference vertical trajectory at a distance along the heading associated with the centerline of the runway in advance of the runway corresponding to the location of the reference point.

16. The system of claim 14, wherein: the information associated with the runway includes procedure information identifying a final approach fix associated with the runway; and the reference point comprises the final approach fix.

17. The system of claim 16, wherein the processing system is configurable to: construct a reference vertical trajectory having a constant flight path angle backwards from the runway to the final approach fix associated with the runway; and identify the target altitude as an altitude of the reference vertical trajectory at the final approach fix.

18. A non-transitory computer-readable medium having instructions stored thereon that are executable by a processing system to render a primary flight display comprising:
a synthetic perspective view of terrain for a region proximate an aircraft; and an estimated vertical margin indicator indicative of an estimated vertical height margin representing an anticipated vertical difference between a target altitude associated with a final approach reference point and a predicted altitude at a location corresponding to the final approach reference point resulting from a gliding vertical trajectory forward from a current altitude and current location of the aircraft, the gliding vertical trajectory corresponding to the aircraft traveling en route from the current location of the aircraft to the final approach reference point descending along an anticipated lateral trajectory gliding from the current altitude at the current location to the final approach reference point, wherein:
the anticipated lateral trajectory for the aircraft is dynamically determined between the current location of the aircraft and the location corresponding to the final approach reference point;
the gliding vertical trajectory for the aircraft en route to the final approach reference point is dynamically determined forward from the current altitude of the aircraft at the current location for a lateral distance corresponding to the anticipated lateral trajectory;
the predicted altitude comprises a first altitude of the gliding vertical trajectory at the location corresponding to the final approach reference point;
the target altitude comprises a second altitude of a reference vertical trajectory at the final approach reference point;
the estimated vertical height margin decreases as the aircraft deviates from the anticipated lateral trajectory to increase the lateral distance; and
the estimated vertical margin indicator dynamically updates as the aircraft deviates from at least one of the anticipated lateral trajectory and the gliding vertical trajectory.

19. The non-transitory computer-readable medium of claim 18, wherein: the primary flight display includes an altitude indicator overlying the synthetic perspective view of terrain; and the estimated vertical margin indicator is adjacent to the altitude indicator.

\* \* \* \* \*